(12) United States Patent
Uranishi

(10) Patent No.: US 8,210,753 B2
(45) Date of Patent: Jul. 3, 2012

(54) CYLINDRICAL ROLLER BEARING DEVICE

(75) Inventor: Takeharu Uranishi, Habikino (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 173 days.

(21) Appl. No.: 12/451,645

(22) PCT Filed: May 22, 2008

(86) PCT No.: PCT/JP2008/059452
§ 371 (c)(1),
(2), (4) Date: Nov. 23, 2009

(87) PCT Pub. No.: WO2008/146704
PCT Pub. Date: Dec. 4, 2008

(65) Prior Publication Data
US 2010/0129019 A1 May 27, 2010

(30) Foreign Application Priority Data
May 24, 2007 (JP) .................................. 2007-137562

(51) Int. Cl.
*F16C 19/52* (2006.01)
(52) U.S. Cl. ........................................ 384/557; 384/569
(58) Field of Classification Search .................. 384/557, 384/564, 569, 570
See application file for complete search history.

(56) References Cited

U.S. PATENT DOCUMENTS

| 4,673,302 A | * | 6/1987 | LaRou | ............................ 384/548 |
| 5,971,622 A |   | 10/1999 | Akazawa | |
| 7,165,891 B2 | * | 1/2007 | Giertz | ............................ 384/418 |

FOREIGN PATENT DOCUMENTS

| JP | 62-183953 | 11/1987 |
| JP | 5-71438 | 9/1993 |
| JP | 6-6753 | 1/1994 |
| JP | 6-12829 | 2/1994 |
| JP | 10-169649 | 6/1998 |
| JP | 10-184674 | 7/1998 |
| JP | 2005-308013 | 11/2005 |
| JP | 2006-250185 | 9/2006 |

* cited by examiner

*Primary Examiner* — Thomas R Hannon
(74) *Attorney, Agent, or Firm* — McGinn IP Law Group, PLLC

(57) ABSTRACT

A gap between a bearing box and a roll portion and so on which are not used for absorbing an expansion of a roll are reduced, and by increasing axial widths of the bearing box and cylindrical roller bearing for that, a loading capacity of the cylindrical roller bearing is enhanced.

A first side face 13A of the bearing box 13 located at one side in the axial direction is disposed outwardly with respect to a central line Y2 between two roll portions 22A, 22B than a second side face 13B located at an other side in the axial direction, and a gap a1 between this first side face 13A and the roll portion 22A opposed thereto is made smaller than a gap a2 between the second side face 13B and the roll portion 22B opposed thereto.

3 Claims, 7 Drawing Sheets

CYLINDRICAL ROLLER BEARING DEVICE

TECHNICAL FIELD

This invention relates to a cylindrical roller bearing device used, for example, for supporting a roll of a continuous casting installation.

BACKGROUND ART

In order to convey a strip-like cast piece (slab) drawn out of a mould, a continuous casting installation is provided with a large number of rolls which rotate about respective axes perpendicular to a conveying direction and are arranged side by side in the conveying direction.

In such a continuous casting installation, in recent years, in order to provide measures against quality problems such as an internal crack, segregation, etc., of the cast piece, there has been a tendency to reduce the dimension of a roll pitch of the rolls. However, in this case, the outer diameter of the roll must be reduced, and therefore there is encountered a disadvantage that the strength of the roll is lowered. To cope with this, not only opposite axial end portions of the roll but also an intermediate portion thereof have been supported by bearings.

FIG. 4 is a cross-sectional view showing a cylindrical roller bearing device 110 used for supporting an intermediate portion of a roll 111. The roll 111 is a mallet type roll which has a shaft portion 121 to be supported by the cylindrical roller bearing device 110 and roll portions 122A, 122B disposed respectively at opposite axial sides of this shaft portion 121 and serving as portions for actually conveying a cast piece. The cylindrical roller bearing device 110 comprises a cylindrical roller bearing 112, and a bearing box 113 supporting the cylindrical roller bearing 112, and the cylindrical roller bearing 112 comprises an inner ring 114 for fitting on the shaft portion 121, an outer ring 115 disposed radially outwardly of this inner ring 114, and cylindrical rollers 116 disposed between the inner ring 114 and the outer ring 115. The inner ring 114 as well as the outer ring 115 is formed as a two-split bearing which is divided into two sections at a radial line. The bearing box 113 is also divided into two sections (113E, 113F) in an upward-downward direction, and one (upper) division section 113E serves also as part of the outer ring 115.

The roll 111 used in a continuous casting installation is expanded by heat from the cast piece, and therefore in order to absorb a thermal expansion of the roll 111, the cylindrical roller bearing device 110 is so constructed that the inner ring 114 and the outer ring 115 are movable relative to each other in an axial direction.

Specifically, ribs 114B are formed respectively at opposite axial sides of a raceway surface 114A of the inner ring 114, and the cylindrical rollers 116 are restrained by the ribs 114B from axial movement relative to the inner ring 114. On the one hand, a raceway surface 115A of the outer ring 115 is formed into a width larger than that of the cylindrical rollers 116, and therefore the cylindrical rollers 116 are movable on this raceway surface 115A in the axial direction. In order that the roll portions 122A, 122B, when moved in the axial direction, will not contact with axial side faces 113A, 113B of the bearing box 113, respectively, gaps a1, a2 are formed respectively between the side face 113A and the roll portion 122A and between the side face 113B and the roll portion 122B.

Incidentally, a continuous casting machine employing mallet type rolls is disclosed in the following Patent Literature 1

Patent Literature 1: JP-UM-A-62-183953 Publication.

DISCLOSURE OF THE INVENTION

Problem that the Invention is to Solve

The conventional cylindrical roller bearing device 110 shown in FIG. 4 was such that its axial opposite sides were formed into a symmetrical shape with respect to a central line Y in the axial direction, and further the central line Y in the axial direction was disposed in a middle position between the two roll portions 122A, 122B in the axial direction, and therefore the gaps a1, a2 each between the bearing box 113 and a respective one of the roll portions 122A, 122B, as well as the widths b1, b2 over which the cylindrical rollers 116 are movable on the outer ring 115, were set to the same amount (a1=a2, b1=b2) at the axial opposite sides.

However, the above roll 111 has such a structure that usually the one axial end is a fixed end so that the roll can be thermally expanded only toward the other axial side (for example, in a direction of arrow X), and therefore as the gap and the width for absorbing this thermal expansion, only the one axial side ones (a2, b1) are used. Therefore, the gap a1 and width b2 on the opposite side exist as useless spaces.

The present invention directs attention to this point, and an object of the invention is to provide a cylindrical roller bearing device in which a gap between a bearing box and a roll portion and so on which are not used for absorbing an expansion of a roll are reduced, and by increasing axial widths of the bearing box and cylindrical roller bearing for that, a loading capacity of the cylindrical roller bearing can be increased.

Means for Solving the Problem

The present invention provides a cylindrical roller bearing device for rotatably supporting a roll which has roll portions formed respectively at opposite axial sides of a shaft portion and made larger in diameter than the shaft portion and can be expanded toward one axial side, wherein the cylindrical roller bearing device comprises an inner ring for fitting on the shaft portion, an outer ring disposed radially outwardly of this inner ring, cylindrical rollers disposed between the inner ring and the outer ring, and a bearing box supporting the outer ring, and the inner ring and the outer ring are moved relative to each other in the axial direction; wherein:

a first side face of the bearing box located at the one axial side is disposed outwardly with respect to a central line between the roll portions, disposed respectively at the opposite axial sides, than a second side face located at an other axial side; and a gap between the first side face and the roll portion opposed thereto is set to a value smaller than a gap between the second side face and the roll portion opposed thereto.

With this arrangement, the gap between the first side face of the bearing box and the roll portion, which is not used for absorbing an expansion of the roll, is reduced, and a width of the bearing box in the axial direction can be increased. Therefore, the axial widths (lengths) of the outer ring and the cylindrical rollers can be increased, and a loading capacity of the cylindrical roller bearing device can be increased.

Preferably, the cylindrical rollers are movable in the axial direction on a raceway surface of one of the outer ring and the inner ring in accordance with a thermal expansion of the roll; and further, the cylindrical rollers are formed to be extended in a direction opposite to the direction of movement thereof relative to the raceway surface of the one, and a width of the raceway surface of the one projecting from these cylindrical rollers in the direction opposite to the direction of movement is set to a value smaller than a width of the raceway surface of the one projecting in the direction of movement.

In this construction, by extending the cylindrical rollers in the direction opposite to the direction of movement of the cylindrical rollers in accordance with the expansion of the roll, the length of the cylindrical rollers can be made longer in the axial direction than before, and therefore the loading capacity of the cylindrical roller bearing device can be increased.

The cylindrical roller bearing of the present invention constructed as described above can be suitably used in a roll device of a continuous casting machine comprising a mallet type roll for conveying a cast piece, and a cylindrical roller bearing supporting the mallet type roll.

Advantage of the Invention

In the present invention, the gap between the bearing box and the roll portion and so on which are not used for absorbing the expansion of the roll are reduced, and by increasing the axial widths of the bearing box and cylindrical roller bearing for that, the loading capacity of the cylindrical roller bearing can be increased.

BEST MODE FOR CARRYING OUT THE INVENTION

Figure 1:
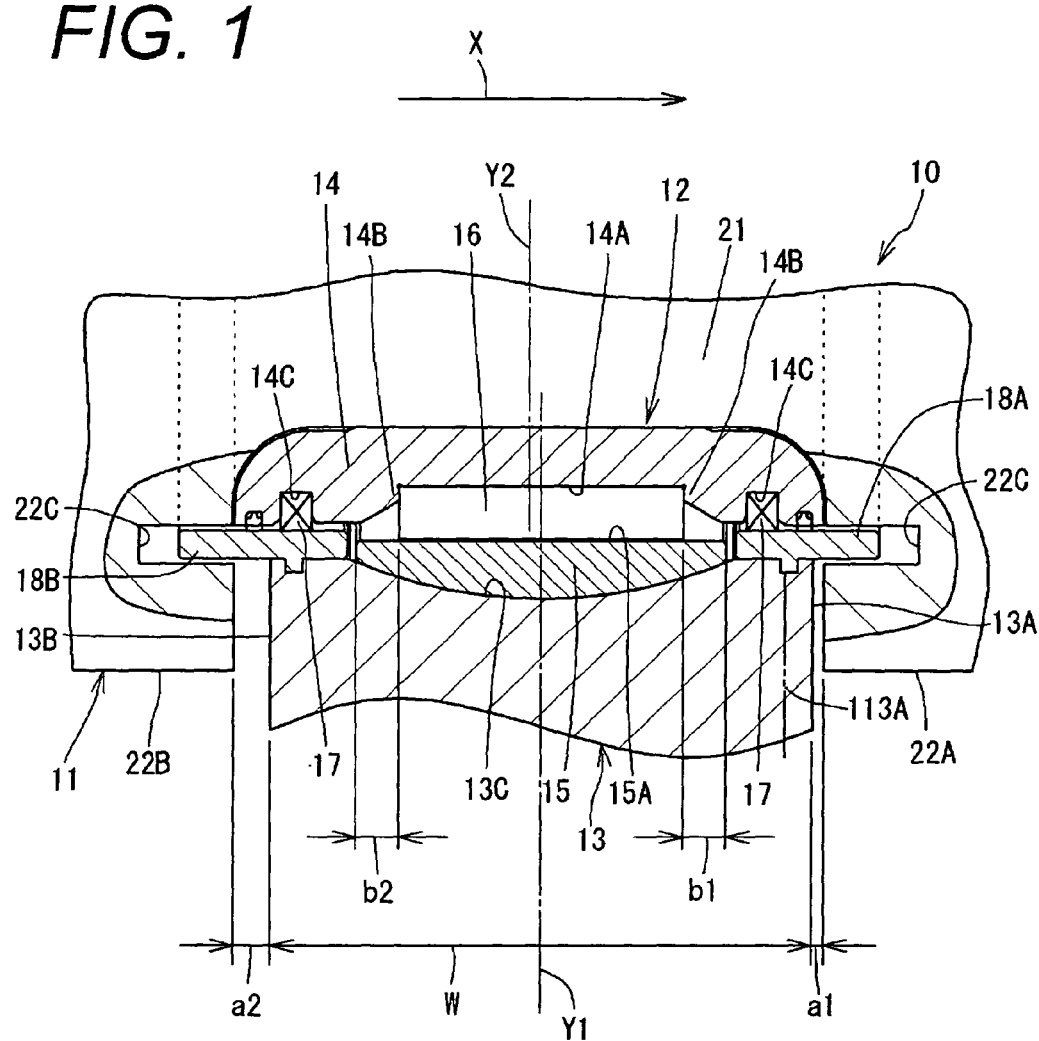
FIG. 1 is a longitudinal cross-sectional view of an important portion of a cylindrical roller bearing device according to a first embodiment of the present invention.
Figure 4:
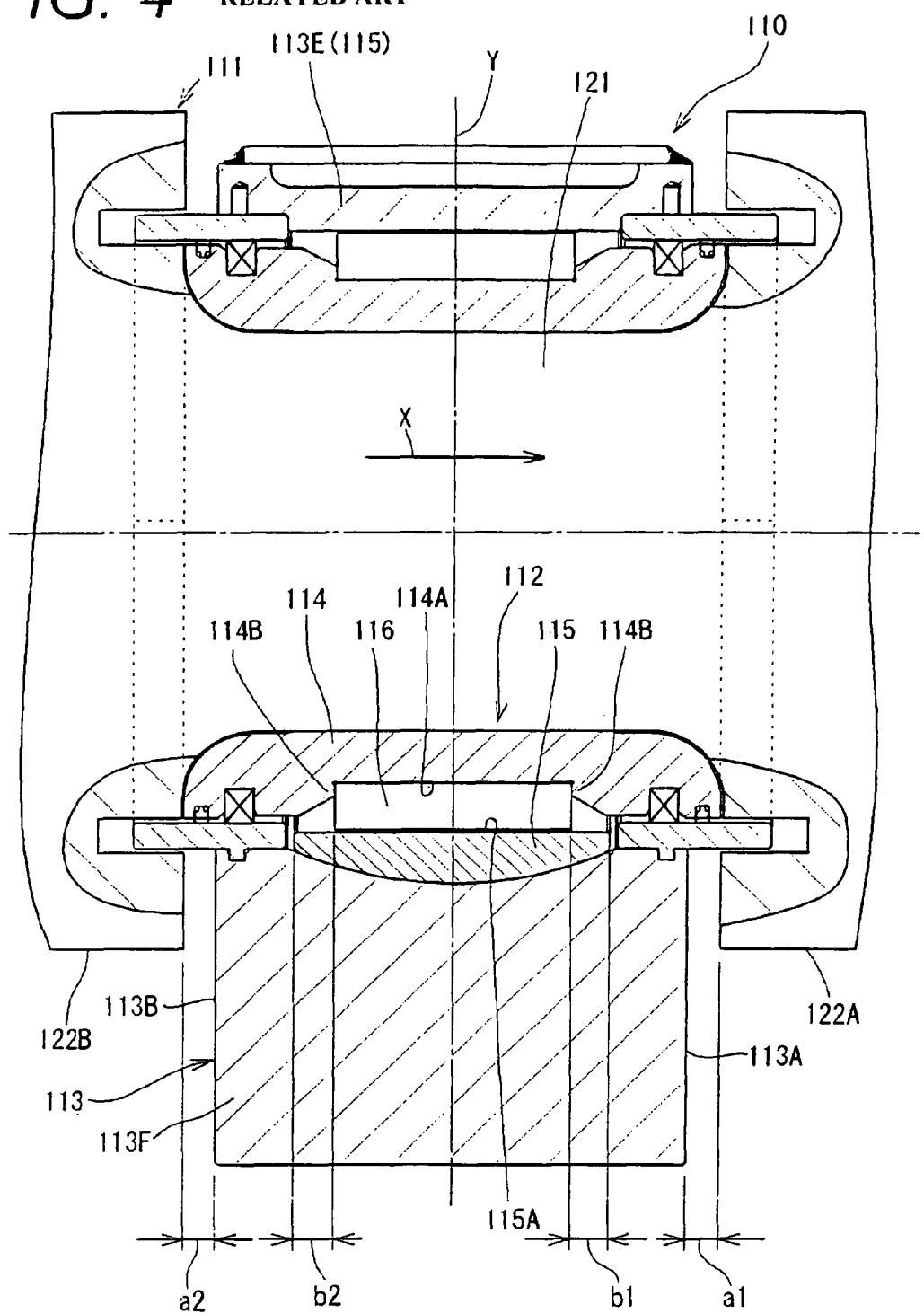
FIG. 4 is a longitudinal cross-sectional view of a cylindrical roller bearing device according to the prior art.
Figure 5:
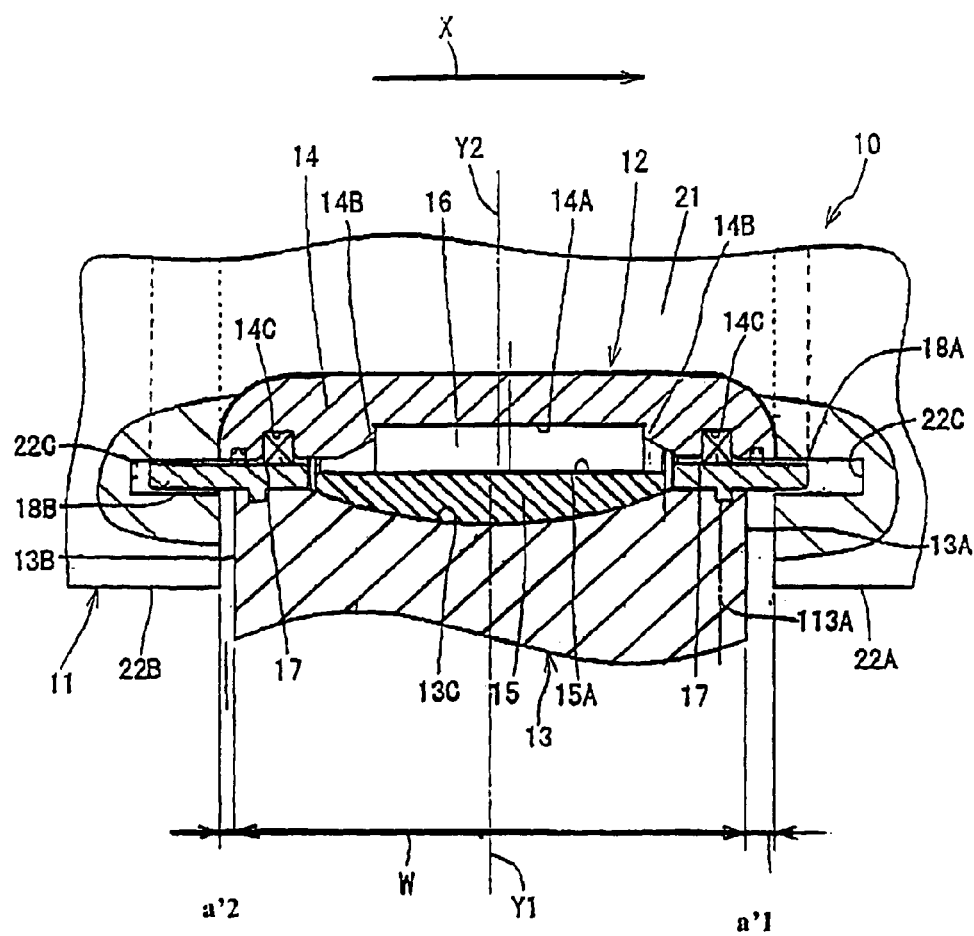
FIG. 5 is a longitudinal cross-sectional view of an important portion of a cylindrical roller bearing device according to the first embodiment of the present invention after the cylindrical rollers are moved in the axial direction.

FIG. 1 and FIG. 5 are longitudinal cross-sectional views of an important portion of a cylindrical roller bearing device 10 according to a first embodiment of the present invention. This cylindrical roller bearing device 10 is used, for example, for supporting a roll 11 for conveying a cast piece (slab; article to be conveyed) in a continuous casting installation, and its basic construction is similar to that of the prior art shown in FIG. 4. Namely, the cylindrical roller bearing device 10 comprises a cylindrical roller bearing 12, and a bearing box (bearing housing) 13 supporting the cylindrical roller bearing 12, and the cylindrical roller bearing 12 includes an inner ring 14, an outer ring 15 disposed radially outwardly of this inner ring 14, and cylindrical rollers 16 disposed between the inner ring 14 and the outer ring 15. The cylindrical roller bearing 12 is formed as a two-split bearing, and the inner ring 14 as well as the outer ring 15 is divided into two sections at a radial line. Incidentally, part of the division section of the outer ring 15 can be used also as the bearing box 13 in the same manner as in FIG. 4.

The roll 11 supported by this cylindrical roller bearing device 10 is a mallet type roll including a shaft portion 21 for fitting in the inner ring 14 and roll portions 22A, 22B which are provided respectively at opposite axial sides of this shaft portion 21 and are larger in diameter than the shaft portion 21. The cast piece is conveyed on outer peripheral surfaces of the roll portions 22A, 22B. The roll 11 is supported at its left side (in FIG. 1) by another bearing device (not shown) in such a condition that an axial movement thereof is restrained, and the roll is thermally expanded (extended) in a right direction (direction of arrow X) by transfer of heat from the cast piece. FIG. 1 shows a condition in which the roll 11 is not thermally expanded.

A raceway surface 14A for the cylindrical rollers 16 is formed on an outer peripheral surface of the inner ring 14, and ribs 14B are formed respectively at axial opposite sides of this raceway surface 14A, and the movement of the cylindrical rollers 16 in the axial direction is restrained by these ribs 14B. Peripheral grooves 14C are formed as recesses outside the ribs 14B in the axial direction, and oil seals 17 are mounted respectively in these peripheral grooves 14C.

The outer ring 15 is smaller in axial width than the inner ring 14. An outer peripheral surface of the outer ring 15 is formed into a spherical shape, and is slidably fitted in a spherical groove 13C formed in an inner peripheral surface of the bearing box 13, and is provided with a self-aligning function. An inner peripheral surface of the outer ring 15 serves as a raceway surface 15A for the cylindrical rollers 16, and an axial width of this raceway surface 15A is larger than an axial length of the cylindrical rollers 16. The cylindrical rollers 16 are disposed at a central portion of the raceway surface 15A in the axial direction, and the raceway surface 15A projects at opposite sides of the cylindrical rollers 16 by the same width ($b1=b2$).

Labyrinth rings 18A, 18B are mounted on the inner peripheral surface of the bearing box 13 and are disposed respectively at opposite sides of the spherical groove 13A. Outer peripheral portions of the above-mentioned oil seals 17 slidably contact inner peripheral surfaces of these labyrinth rings 18A, 18B, respectively. Outer end portions of the labyrinth rings 18A, 18B in the axial direction are inserted respectively in recessed portions 22C formed respectively in side faces of the roll portions 22A, 22B.

One axial side face (right face in FIG. 1; hereinafter referred to as "first side face") 13A of the bearing box 13 is disposed outwardly (rightwardly) with respect to a central line Y2 between the two roll portions 22A, 22B than the other axial side face (left face in FIG. 1; hereinafter referred to as "second side face") 13B thereof. The first side face 13A is disposed close to the right roll portion 22A opposed to this first side face, and a gap a1 between the two is set to a value smaller than a gap a2 between the second side face 13B and the left roll portion 22B opposed to this second side face. In FIG. 1, the position of the first side face 113A of the conventional bearing box 113 (see FIG. 4) is indicated in a two-dot chain line for comparison purposes.

The first side face 13A of the bearing box 13 is disposed outwardly in the axial direction, so that the width W of the bearing box 13 is made larger than before, and as a result the outer ring 15 as well as the cylindrical rollers 16 is formed to be extended outwardly (rightwardly) in the axial direction. With this arrangement, a central line Y1 of the bearing box 13, the outer ring 15 and the cylindrical roller 16 coincide with each other in the axial direction, and this central line Y1 is offset in the axial direction toward one side (right) from the central line Y2 between the two roll portions 22A, 22B. A central line of the inner ring 14 in the axial direction coincides with the central line Y2 between the two roll portions 22A, 22B in the same manner as in the conventional construction.

When the roll 11 is expanded in the direction of arrow X by heat from the cast piece, the inner ring 14 and the cylindrical rollers 16 move in the same direction X, and the movement of the cylindrical rollers 16 is absorbed by the width b1 of the raceway surface 15A projecting right from the cylindrical rollers 16. Also, the movement of the roll portion 22B is absorbed by the gap a2 formed between it and the second side face 13B of the bearing box 13. Therefore, the gap a1 between the first side face 13A and the roll portion 22A and the width b2 of the raceway surface 15A projecting left from the cylindrical rollers 16 are not used for absorbing the thermal expansion of the roll 11.

In this embodiment, the first side face 13A of the bearing box 13 disposed at the side where the gap a1 between it and the roll portion 22A is widened by the above thermal expansion of the roll 11 is disposed outwardly in the axial direction than before, and by doing so, the useless space (a1 in FIG. 4) which has heretofore developed is reduced, and the width W of the bearing box 3 is increased. Therefore, the outer ring 15 and the cylindrical rollers 16 can be more extended in the axial direction than before, so that the loading capacity of the cylindrical roller bearing 12 can be increased. The gaps a1 and a2 are changed to a'1 and a'2 in response to the movement in the axial direction.

Even when the width W of the bearing box 13 is increased, the distance (a2+W+a1) between the two roll portions 22A, 22B is not different from before, and therefore no difficulty is encountered in conveying the cast piece, and an inferior quality of the cast piece will not be incurred.

Figure 2:
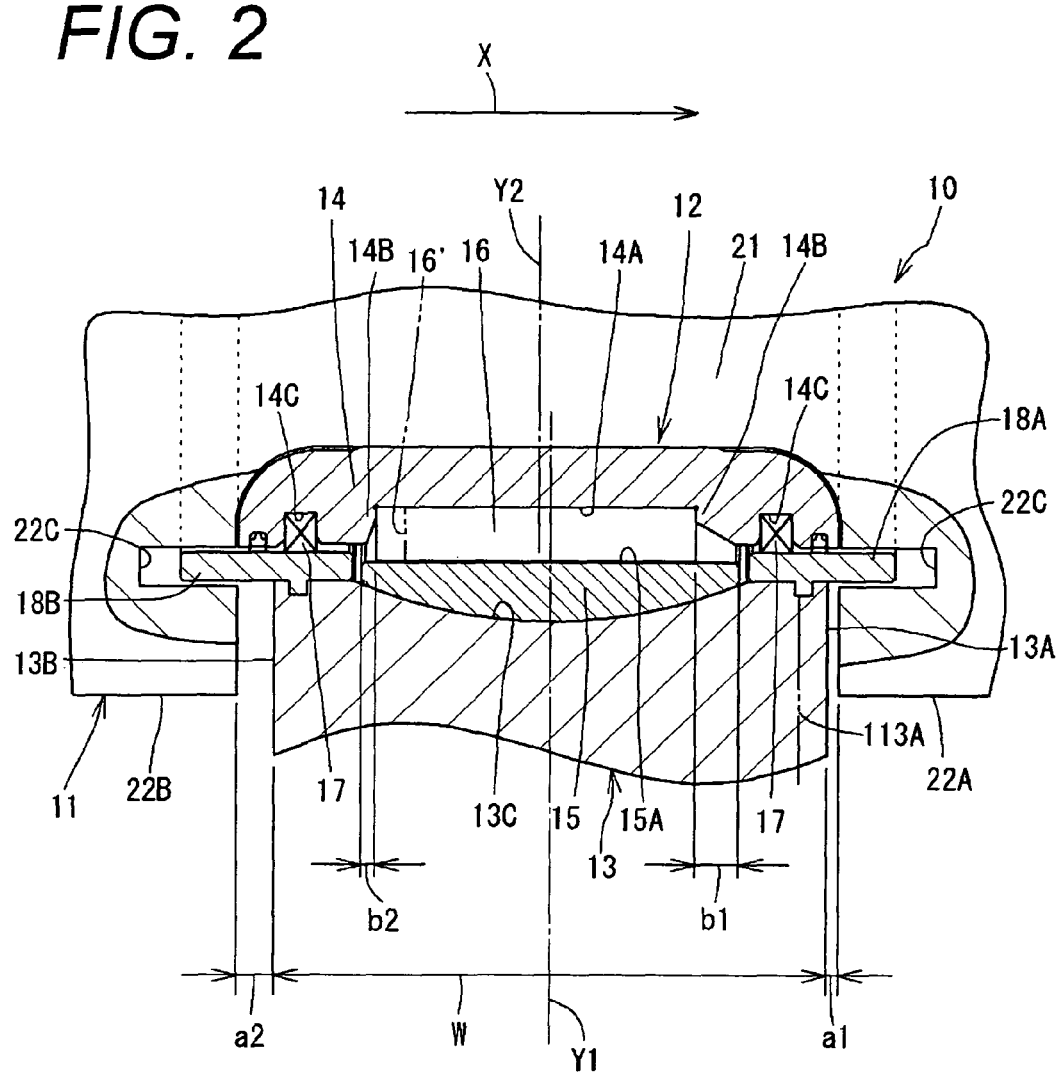
FIG. 2 is a longitudinal cross-sectional view of an important portion of a cylindrical roller bearing device according to a second embodiment of the present invention.
Figure 6:
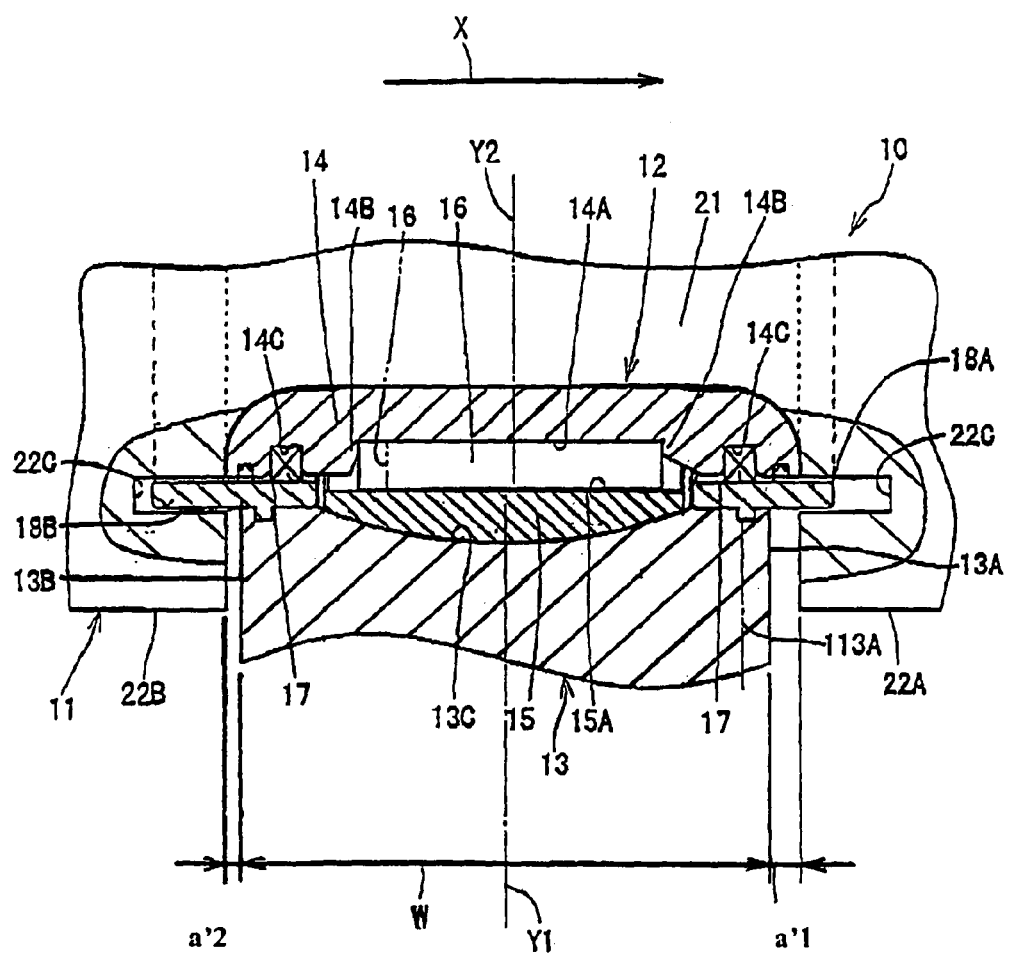
FIG. 6 is a longitudinal cross-sectional view of an important portion of a cylindrical roller bearing device according to the second embodiment of the present invention after the cylindrical rollers are moved in the axial direction.

FIG. 2 and FIG. 6 are longitudinal cross-sectional views of an important portion of a cylindrical roller bearing device 10 according to a second embodiment of the present invention. This embodiment differs from the above first embodiment in that cylindrical rollers 16 are extended in the axial direction toward the other side (left), and the other construction is the same. Incidentally, in FIG. 2, the position (reference numeral 16') of the left end portion of the cylindrical rollers 16 of the first embodiment is indicated in a two-dot chain line for comparison purposes.

As a result of extending the cylindrical rollers 16 in this mariner, an axially central line Y2 of an inner ring 14 coincides with or substantially coincides with an axially central line of the cylindrical rollers 16. Furthermore, a width b2 of a raceway surface 15A projecting left from the cylindrical rollers 16 is smaller than a width b1 projecting right.

In this embodiment, the cylindrical rollers 16 are extended in the direction (anti-X direction) opposite to a direction of movement of the cylindrical rollers 16 in accordance with a thermal expansion of a roll 11, and by doing so, the useless space (b2 in FIG. 4) which has heretofore developed is reduced, and the loading capacity of a cylindrical roller bearing 12 can be further increased.

Figure 3:
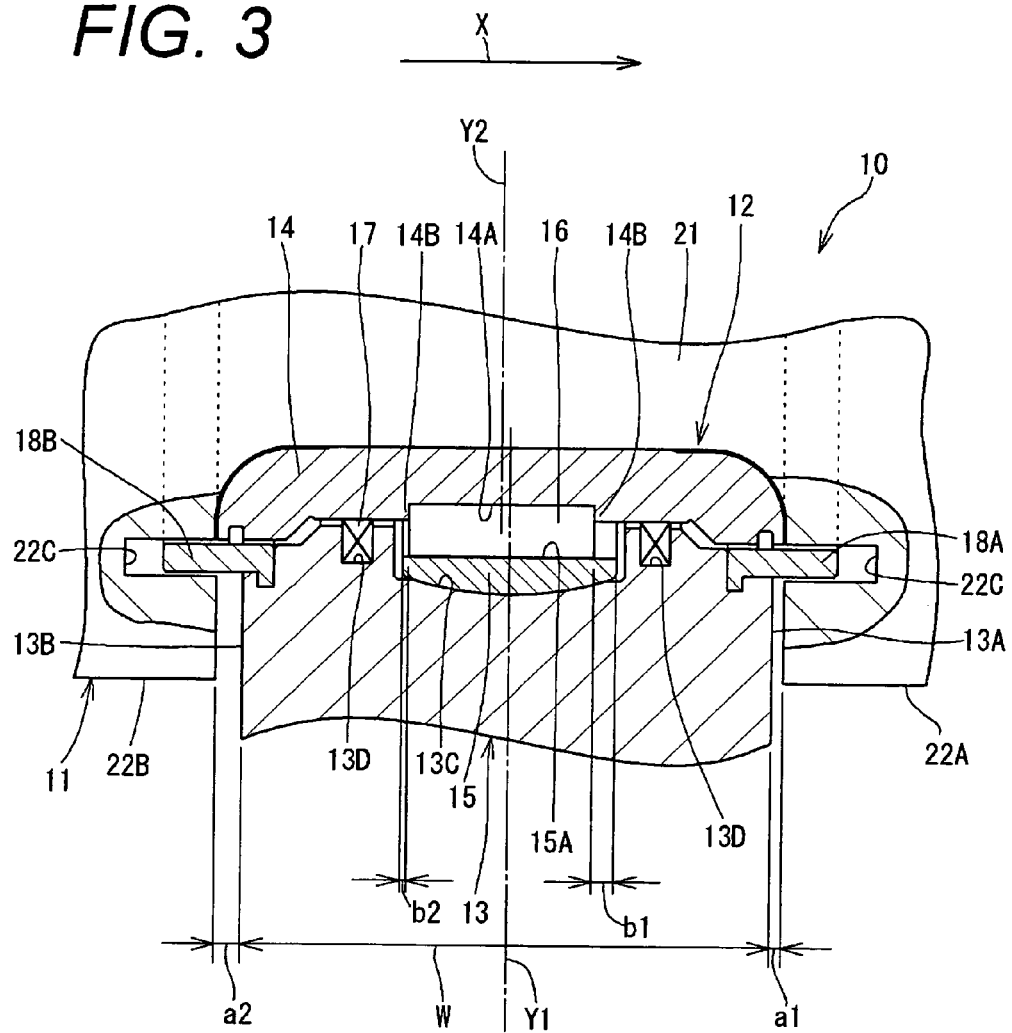
FIG. 3 is a longitudinal cross-sectional view of an important portion of a cylindrical roller bearing device according to a third embodiment of the present invention.
Figure 7:
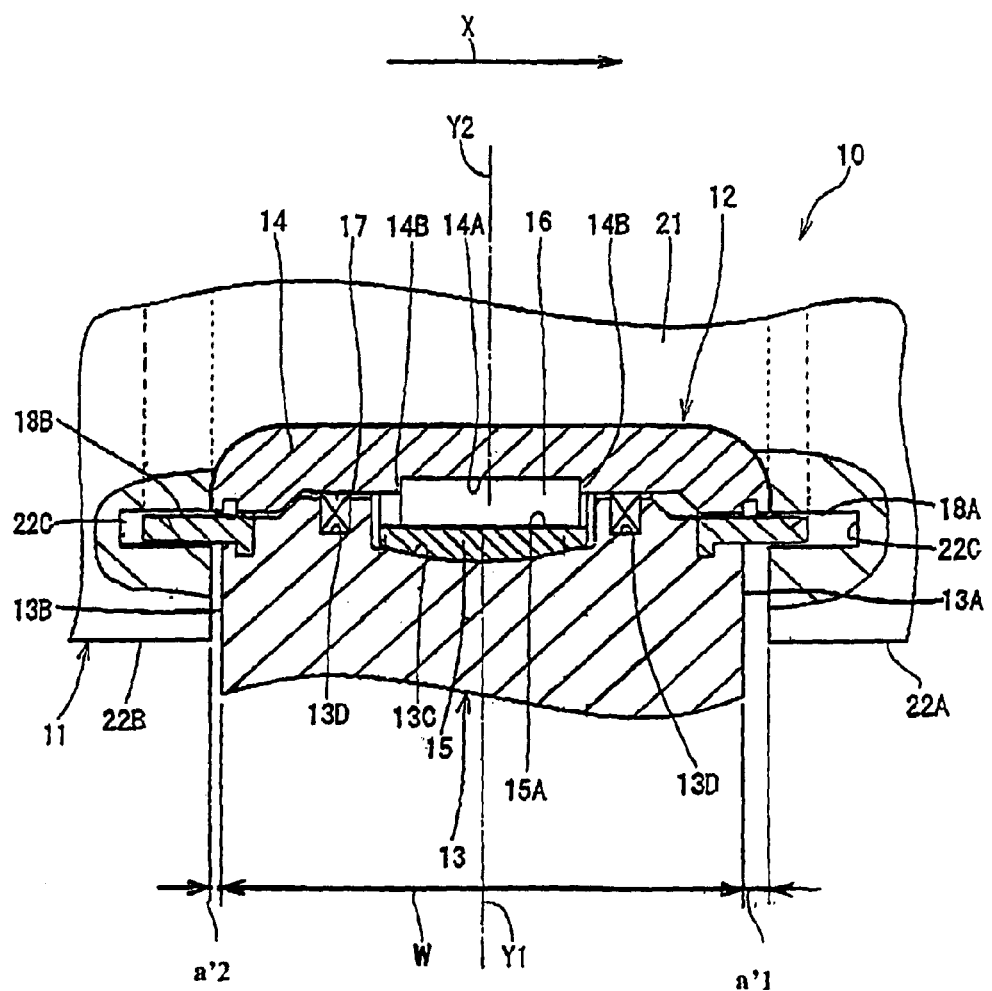
FIG. 7 is a longitudinal cross-sectional view of an important portion of a cylindrical roller bearing device according to the third embodiment of the present invention after the cylindrical rollers are moved in the axial direction.

FIG. 3 and FIG. 7 are longitudinal cross-sectional views of an important portion of a cylindrical roller bearing device 10 according to a third embodiment of the present invention. This embodiment differs from the second embodiment in that oil seals 17 are mounted respectively in peripheral grooves 13D formed in an inner peripheral surface of a bearing box 13 such that inner peripheral portions of the oil seals 17 slidably contact an outer peripheral surface of an inner ring 14. The other construction and operational effects are substantially similar to those of the second embodiment, and therefore detailed explanation thereof will be omitted.

The present invention is not limited to the above embodiments, and suitable design changes can be made.

For example, although the cylindrical roller bearings of the above embodiments are such that the cylindrical rollers 16 move in the axial direction on the raceway surface 15A of the outer ring 15 in accordance with the thermal expansion of the roll 11, the cylindrical rollers may move in the axial direction on the raceway surface 14A of the inner ring 14 (The inner ring 14 move on the cylindrical rollers 16). Furthermore, the present invention can be applied to other apparatuses than the continuous casting installation, in which a roll can be expanded in the axial direction toward one side by heat from an article to be conveyed, etc.

The invention claimed is:

1. A cylindrical roller bearing device for rotatably supporting a roll which includes roll portions formed respectively at opposite axial sides of a shaft portion and made larger in diameter than said shaft portion and which can be expanded in an axial direction toward one axial side, the cylindrical roller bearing device comprising:
   an inner ring for fitting on said shaft portion;
   an outer ring disposed radially outwardly of said inner ring;
   cylindrical rollers disposed between said inner ring and said outer ring; and
   a bearing box supporting said outer ring,
   wherein said inner ring and said outer ring are movable relative to each other in the axial direction,
   wherein a first side face of said bearing box located at said one axial side is disposed outwardly with respect to a central line between said roll portions, disposed respectively at the opposite axial sides, than a second side face located at an other axial side, and
   wherein a gap between said first side face and said roll portion opposed thereto is set smaller than a gap between said second side face and said roll portion opposed thereto.

2. A cylindrical roller bearing device as defined in claim 1, wherein said cylindrical rollers are movable in the axial direction on a raceway surface of one of said outer ring and said inner ring in accordance with a thermal expansion of said roll, and
   wherein said cylindrical rollers are formed to be extended in a direction opposite to the direction of movement thereof relative to the raceway surface of said one of said outer ring and said inner ring, and a width of the raceway surface of said one of said outer ring and said inner ring projecting from said cylindrical rollers in the direction opposite to said direction of movement is set smaller than a width of the raceway surface of said one of said outer ring and said inner ring projecting in said direction of movement.

3. A roll device of a continuous casting machine comprising a mallet type roll for conveying a cast piece, and a cylindrical roller bearing as defined in claim 1 which supports said mallet type roll.

* * * * *